(12) United States Patent
Cheng

(10) Patent No.: US 11,653,123 B2
(45) Date of Patent: May 16, 2023

(54) LIGHT SENSOR MODULE, METHOD FOR ACQUIRING LIGHT SENSOR DATA, AND ELECTRONIC EQUIPMENT

(71) Applicant: BEIJING XIAOMI MOBILE SOFTWARE CO., LTD., Beijing (CN)

(72) Inventor: Chihjen Cheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 390 days.

(21) Appl. No.: 16/925,784

(22) Filed: Jul. 10, 2020

(65) Prior Publication Data

US 2021/0266483 A1 Aug. 26, 2021

(30) Foreign Application Priority Data

Feb. 26, 2020 (CN) .......................... 202010119937.6

(51) Int. Cl.
*H04N 5/378* (2011.01)
*H04N 5/3745* (2011.01)
*G01N 1/42* (2006.01)
*G06V 40/12* (2022.01)
*H04N 25/75* (2023.01)
(Continued)

(52) U.S. Cl.
CPC ............ *H04N 25/75* (2023.01); *G01J 1/4204* (2013.01); *G01J 1/4228* (2013.01); *G06V 40/12* (2022.01); *H04N 25/772* (2023.01)

(58) Field of Classification Search
CPC .. H04N 5/378; H04N 5/37455; H04N 5/3745; H04N 5/374; H04N 5/369; H04N 5/351; H04N 5/335; H04N 5/255; G06V 40/13; G06V 10/12; G01J 2001/444; G01J 2001/4233; G01J 1/46; G01J 1/4228; G01J 1/4204; H01N 25/75; H01N 25/71; H01N 25/76; H01N 25/77; H01N 25/772;
(Continued)

(56) References Cited

U.S. PATENT DOCUMENTS 5,929,689 A 7/1999 Wall
6,538,591 B2 * 3/2003 Sato ..................... H04N 1/195
341/155
(Continued)

FOREIGN PATENT DOCUMENTS

JP 2003209750 A 7/2003
JP 2010071987 A 4/2010
(Continued)

OTHER PUBLICATIONS

Supplementary European Search Report in the European application No. 20189571.1, dated Jun. 4, 2021.
(Continued)

*Primary Examiner* — John R Lee
(74) *Attorney, Agent, or Firm* — Syncoda LLC; Feng Ma

(57) ABSTRACT

A light sensor module includes a substrate. A first detection region is provided on the substrate. At least one photosensitive device is provided inside the first detection region. The at least one photosensitive device is adapted to collecting first light sensor data from the first detection region under current incident light. The first light sensor data are used for determining whether light sensor data collected by the light sensor module under the current incident light are to be compensated.

18 Claims, 14 Drawing Sheets

(51) Int. Cl.
*G01J 1/42* (2006.01)
*H04N 25/772* (2023.01)

(58) Field of Classification Search
CPC .... H01N 25/74; H01N 25/771; H01N 25/778; H01N 25/779; H01N 25/78; H01N 25/79
See application file for complete search history.

(56) References Cited

U.S. PATENT DOCUMENTS

| | | | | |
|---|---|---|---|---|
| 9,190,433 | B2* | 11/2015 | Chua | H01L 27/1443 |
| 2005/0191047 | A1 | 9/2005 | Toji | |
| 2006/0251413 | A1 | 11/2006 | Toji | |
| 2010/0060562 | A1* | 3/2010 | Hadwen | H01L 31/02164 |
| | | | | 250/208.2 |
| 2014/0111280 | A1 | 4/2014 | Schuppener | |
| 2014/0263972 | A1* | 9/2014 | Chua | H01L 31/11 |
| | | | | 250/208.2 |
| 2021/0210439 | A1* | 7/2021 | Lim | G01J 1/44 |
| 2021/0266483 | A1* | 8/2021 | Cheng | H04N 5/35563 |
| 2021/0407435 | A1* | 12/2021 | Tang | G09G 3/3291 |

FOREIGN PATENT DOCUMENTS

| | | |
|---|---|---|
| JP | 2020504886 A | 2/2020 |
| WO | 2019019347 A1 | 1/2019 |

OTHER PUBLICATIONS

Notice of Allowance of the Japanese Application No. 2020-131414, dated Jun. 3, 2022.
Partial Supplementary European Search Report in the European application No. 20189571.1, dated Dec. 23, 2020.
First Office Action of the Japanese application No. 2020-131414, dated Oct. 26, 2021.

* cited by examiner

LIGHT SENSOR MODULE, METHOD FOR ACQUIRING LIGHT SENSOR DATA, AND ELECTRONIC EQUIPMENT

CROSS-REFERENCE TO RELATED APPLICATION

This application claims priority to Chinese Patent Application No. 202010119937.6 filed on Feb. 26, 2020, the disclosure of which is hereby incorporated by reference in its entirety.

BACKGROUND

With ever-increasing screen ratios of displays in electronic devices, full-screen devices have become trendy. For a full screen, a sensor (such as a light sensor) previously located on a display may have to be provided under the full screen. Take a photosensitive sensor as an example. After ambient light passes through a full screen, the photosensitive sensor may collect light and acquire light intensity, information such as a fingerprint image as needed may be detected based on the light intensity.

SUMMARY

The present disclosure relates generally to the field of detection. Embodiments herein provide a light sensor module, a method for acquiring light sensor data, and electronic equipment.

According to an aspect herein, a light sensor module may include a substrate. A first detection region may be provided on the substrate. At least one photosensitive device may be provided inside the first detection region. The at least one photosensitive device may be adapted to collecting first light sensor data from the first detection region under current incident light. The first light sensor data may be used for determining whether light sensor data collected by the light sensor module under the current incident light are to be compensated.

According to an aspect herein, a method for acquiring light sensor data may include:
acquiring first light sensor data from a first detection region in a light sensor module under incident light;
comparing the first light sensor data to a set threshold; and
in response to determining that the first light sensor data exceed the set threshold, compensating light sensor data collected by the light sensor module.

According to an aspect herein, electronic equipment may include a display, a light sensor module, a processor, and memory.

The light sensor module may be provided under the display.

The memory may be adapted to storing a computer program executable by the processor.

The processor may be adapted to executing the computer program stored in the memory to implement the method herein.

The above general description and detailed description below are but exemplary and explanatory, and do not limit the subject disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
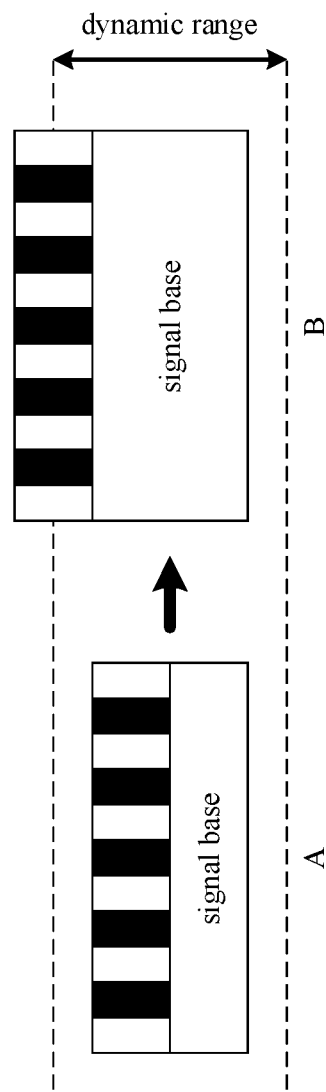
FIG. 1 is a schematic diagram illustrating a dynamic range of a photosensitive sensor.

Exemplary embodiments (examples of which are illustrated in the accompanying drawings) are elaborated below. The following description refers to the accompanying drawings, in which identical or similar elements in two drawings are denoted by identical reference numerals unless indicated otherwise. Implementations set forth in the following exemplary embodiments do not represent all implementations in accordance with the subject disclosure. Rather, they are mere examples of the apparatus (i.e., device) and method in accordance with certain aspects of the subject disclosure as recited in the accompanying claims. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

A term used in an embodiment herein is merely for describing the embodiment instead of limiting the subject disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that."

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, option, etc., may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

In addition, a term such as "first," "second," etc., may serve but for description purposes and should not be construed as indication or implication of relevancy, or implication of a quantity of technical features under consideration. Accordingly, a feature with an attributive "first," "second," etc., may expressly or implicitly include at least one such feature. Herein by "multiple", it may mean two or more unless indicated otherwise expressly.

In some applications, a photosensitive sensor may be made of a photosensitive Thin-Film Transistor (TFT) according to a solution of a large-area optical fingerprint under a low-cost Organic Light-Emitting Diode (OLED) screen. A quality fingerprint image may form a basis of fingerprint unlocking interpretation. That is, the better a contrast of a fingerprint image, the better fingerprint unlocking may work.

To acquire a better contrast, a photosensitive sensor may have to be exposed to light for a certain duration. Under normal light, a certain duration of exposure may result in a signal base as shown in part A of FIG. 1. When exposed to stronger light for a constant duration, a photosensitive sensor may detect a stronger signal, resulting in a higher signal base as shown in part B of FIG. 1.

In this case, a sum of the signal base and the signal per se may exceed a dynamic range of a readout integrated circuit (ROIC) of a rear end of the photosensitive sensor. In other words, in case of a higher signal base, a ROIC may truncate a signal and cause signal distortion, decreasing accuracy in detection.

In view of this, some embodiments of the present disclosure provide a light sensor module and a method for acquiring light intensity. A first detection region may be provided on a substrate of a light sensor module according to some embodiments of the present disclosure. At least one photosensitive device may be provided inside the first detection region. That is, with embodiments herein, light sensor data (referred hereinafter as first light sensor data) under current incident light may be acquired using the at least one photosensitive device. It may be determined, using the first light sensor data, whether light sensor data collected by the light sensor module under the current incident light are to be compensated. For example, when the first light sensor data exceed a set threshold, light sensor data collected by the light sensor module may be compensated. When the first light sensor data are no greater than the set threshold, it may not be necessary to compensate the light sensor data collected by the light sensor module. Accordingly, with embodiments herein, light sensor data detected by a light sensor module may match current incident light, avoiding occurrence of an insufficient dynamic range of the ROIC, increasing accuracy in detection.

Figure 2:
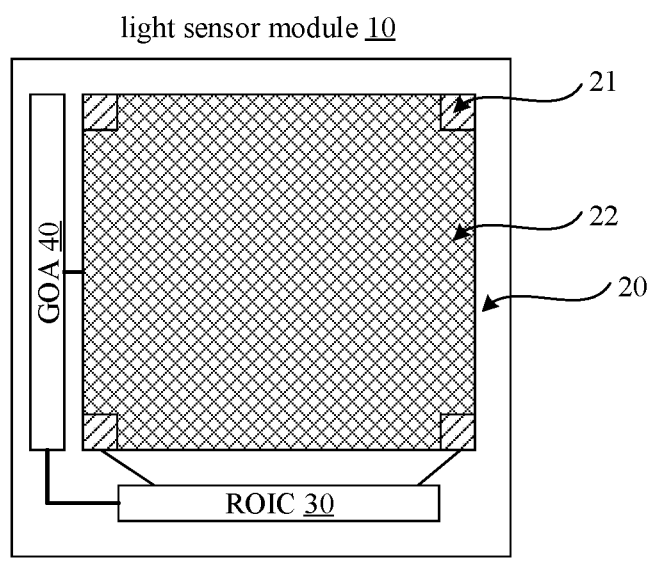
FIG. 2 is a diagram of a light sensor module according to some embodiments of the present disclosure.

A specific structure of a light sensor module is introduced below. Referring to FIG. 2, a light sensor module 10 may include a substrate 20. The substrate 20 may include a first detection region 21 and a second detection region 22.

At least one photosensitive device may be provided inside the first detection region 21. The at least one photosensitive device may be adapted to collecting first light sensor data under current incident light. The first light sensor data may be used for determining whether light sensor data collected by the light sensor module under the current incident light are to be compensated.

A number of photosensitive devices may be provided inside the second detection region 22. The photosensitive device may collect second light sensor data under the under current incident light. The second light sensor data may be the light sensor data collected.

Understandably, the second light sensor data may be the light sensor data collected by the light sensor module. The first light sensor data are assist data that assist in determining whether the second light sensor data are to be compensated. The assist data per se may not necessarily be output by the light sensor module.

Consider a scene of application of a light sensor module, such as a fingerprint sensor. With embodiments herein, the first detection region 21 may be provided outside the second detection region 22. In addition, considering time and an amount of computation required to process light sensor data, with embodiments herein, an area of the first detection region may be less than an area of the second detection region, thereby reducing the light sensor data collected by the at least one photosensitive device inside the first detection region. Understandably, the size of the area of the first detection region and of the second detection region may be provided according to a specific scene, which is not limited herein.

With embodiments herein, the first detection region may include at least one sub detection region.

Figure 3A:
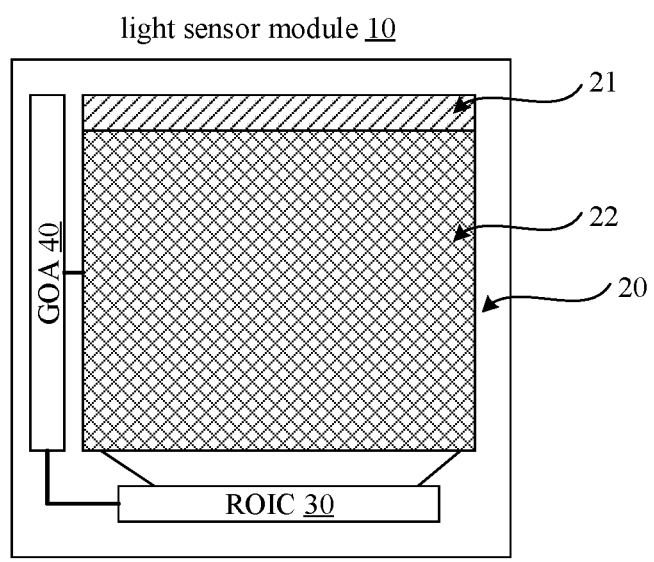
FIG. 3A is a first diagram of a layout of a first detection region according to some embodiments of the present disclosure.
Figure 3B:
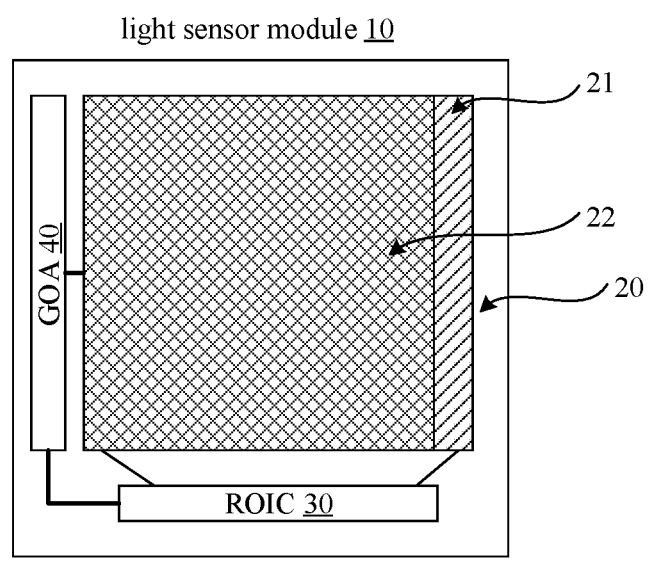
FIG. 3B is a second diagram of a layout of a first detection region according to some embodiments of the present disclosure.
Figure 3C:
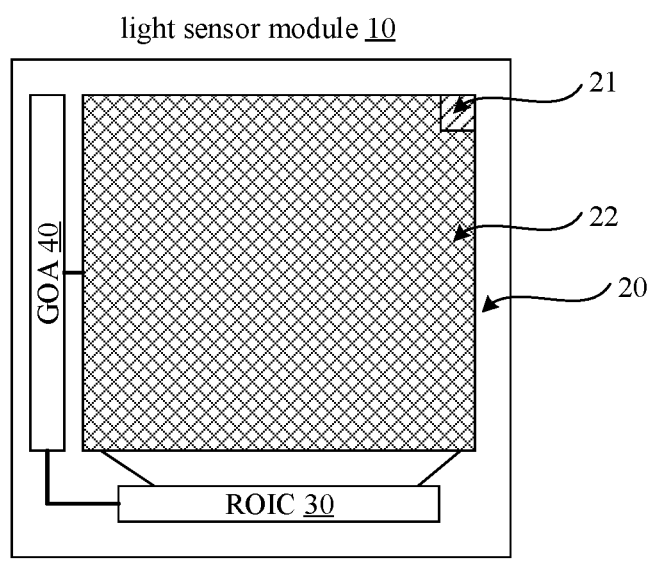
FIG. 3C is a third diagram of a layout of a first detection region according to some embodiments of the present disclosure.

For example, there may be one sub detection region. Refer to FIG. 3A, FIG. 3B, and FIG. 3C. FIG. 3A and FIG. 3B show scenes with a bar sub detection region. FIG. 3A shows a scene with a sub detection region provided above the second detection region. FIG. 3B shows a scene with a sub detection region provided to the right of the second detection region. A sub detection region may be provided below the second detection region. A sub detection region may be provided to the left of the second detection region. A corresponding solution thereof likewise falls into the scope of the subject disclosure.

Note that according to the embodiment, by providing a bar region, it may be avoided that a finger of a user covers up the entire first detection region. In application, it may be provided that a length of a bar region is greater than a width of a finger, ensuring that a photosensitive device inside the first detection region may detect incident light. In addition, a bar-shaped first detection region may be manufactured with ease, improving yield.

Figure 3D:
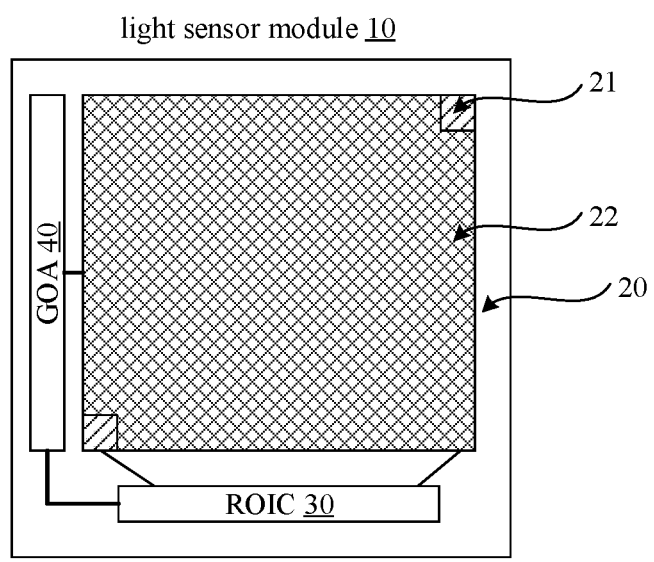
FIG. 3D is a fourth diagram of a layout of a first detection region according to some embodiments of the present disclosure.
Figure 3E:
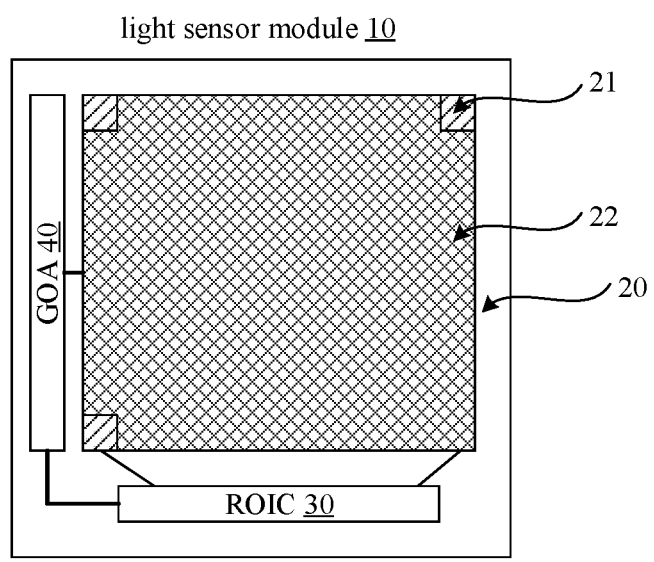
FIG. 3E is a fifth diagram of a layout of a first detection region according to some embodiments of the present disclosure.

For example, there may be multiple sub detection regions. Refer to FIG. 3D, FIG. 3E, and FIG. 2. FIG. 3D shows a scene where 2 square sub detection regions are provided. FIG. 3E shows a scene where 3 sub detection regions are provided. FIG. 2 shows a scene where 4 sub detection regions are provided. The multiple sub detection regions may be provided at vertices of the second detection region.

Note that according to the embodiment, by providing a sub detection region at a vertex, a distance between two sub detection regions on a diagonal may be maximized. Accordingly, it is unlikely that a finger may cover the two sub detection regions simultaneously, ensuring that a photosensitive device inside the first detection region may detect incident light.

Also note that when there are multiple sub detection regions, a solution formed by a combination including a bar sub detection region and a square sub detection region may likewise fall into the scope of the subject disclosure.

With embodiments herein, an area of a photosensitive device inside the first detection region 21 may be greater than an area of a photosensitive device inside the second detection region 22, ensuring an amount of incident light incident on a photosensitive device, reducing a collecting time. According to an example, a photosensitive device may include multiple photosensitive devices. That is, photosensitive devices (such as a TFT) may be made on a substrate using one process. Then, gate lines of the multiple photosensitive devices inside the first detection region 21 may be connected to each other. Data lines of the multiple photosensitive devices may be connected to each other. That is, the multiple photosensitive devices may sense incident light simultaneously and output light sensor data simultaneously. In other words, according to these embodiments, a ratio of an area of a photosensitive device to an area of the photosensitive device may be 1:n. The n may be 4-9.

Referring again to FIG. 2, the light sensor module may further include a gate driver on array (GOA) 40 and a ROIC 30, which may work as follows.

To collect new light sensor data, the GOA 40 may turn on each row of photosensitive devices in turn. In this case, a data line may input a set value to a photosensitive device. That is, the photosensitive device may be cleared (or reset). Then, the photosensitive device may sense incident light for a duration (such as 70 ms). The GOA 40 may input a valid signal to each row of gates to turn on each line of photosensitive devices. The ROIC 30 may read light sensor data. Note that a light sensor module made based on a TFT may work according to a principle similar to that of an array substrate made based on a TFT, which is not repeated herein.

Note that when multiple sub detection regions are provided inside the first detection region, the ROIC 30 may read light sensor data in an order. The GOA 40 may provide a number of dedicated pins to be connected to respective sub detection regions. For example, there may be a one-to-one correspondence between the dedicated pins and the sub detection regions. In this case, the ROIC may read light sensor data in each sub detection region sub region by sub region. According to an example, a dedicated pin may correspond to one row of sub detection regions. In this case, the ROIC may read light sensor data in each row of sub detection regions row by row. According to an example, all sub detection regions may be connected to one dedicated pin. In this case, the ROIC may read light sensor data in all rows of sub detection regions simultaneously.

With embodiments herein, a photosensitive device may be provided in the first detection region. A photosensitive device may be provided in the second detection region. Accordingly, the light sensor module may work in a cycle as follows.

First, light sensor data collected by a photosensitive device inside the first detection region may be acquired, in a process as illustrated above. Maximal light sensor data may be taken as the first light sensor data.

Then, light sensor data collected by a photosensitive device inside the second detection region may be acquired, in a process as illustrated above.

That is, according to these embodiments, a frame of light sensor data may be acquired in two parts. A first part to be acquired may be light sensor data corresponding to the first detection region, i.e., the first light sensor data. The second part to be acquired may be light sensor data corresponding to the second detection region, i.e., the second light sensor data. In addition, the first part and the second part may have to be acquired in the fixed order. This is because electronic equipment using the light sensor module may have to determine, according to the first light sensor data, whether the second light sensor data are to be compensated.

Figure 4:
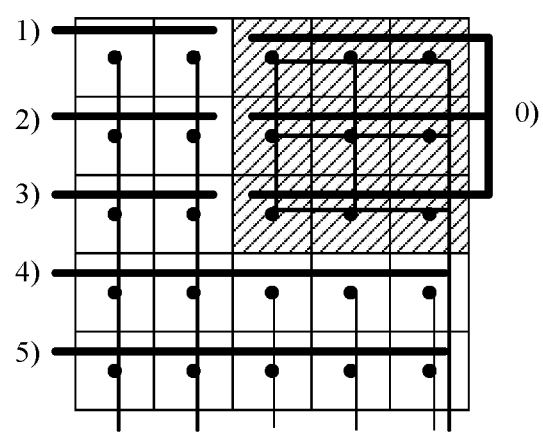
FIG. 4 is a diagram of an example of an array substrate of a light sensor module according to some embodiments of the present disclosure.

FIG. 4 is a diagram of an example of an array substrate of a light sensor module according to some embodiments of the present disclosure. FIG. 4 is a scene where one first detection region is set. A light sensor device inside the first detection region (shaded) may include 9 pixels. Gate lines of the 9 pixels may be connected to each other in parallel. Data lines of the 9 pixels may be connected to each other in parallel. The second detection region (blank) may include 5 rows of pixels, i.e., 1) 2) 3) 4) 5). Then, the light sensor module may acquire light sensor data using an array substrate shown in FIG. 4 as follows.

First, light sensor data collected by pixels inside the first detection region may be read. Then, light sensor data collected by pixels inside the second detection region may be read. That is, pixels may be enabled respectively in the order of gate lines 0)→1) 2) 3) 4) 5). Light sensor data may be read while all pixels are enabled. Pixels along the gate lines 0) may be enabled first, and then the row 1) of pixels may be enabled, with a variable interval in between. The rows 1)~5) of pixels may be enabled row by row in a variable order, generally with a fixed interval. Accordingly, readout time may be saved when a large amount of light sensor data are acquired.

When the first detection region includes multiple sub detection regions, light sensor data collected by pixels inside the multiple sub detection regions may be read in an order as follows.

According to some embodiments of the present disclosure, light sensor data collected in respective sub detection regions may be read simultaneously. Then, the second light sensor data inside the second detection region may be read row by row.

According to some embodiments of the present disclosure, first, light sensor data collected by pixels inside multiple sub detection regions located at one row may be read simultaneously or sub region by sub region. Then, light sensor data in multiple sub detection regions at another row may be read. For example, sub detection regions may be provided at four corners. Then, light sensor data in the two sub detection regions at the upper row may be read first. Then, light sensor data in the two sub detection regions at the lower row may be read. After light sensor data in all sub detection regions have been read, light sensor data inside the second detection region may be read row by row.

When multiple sub detection regions are provided, compensation may be performed as long as light sensor data in one of the sub detection regions exceed a set threshold. When light sensor data in multiple sub detection regions exceed the set threshold, the maximal light sensor data (i.e., the first light sensor data) may be set as a compensating value. In some embodiments, light sensor data within a distinct interval may be set to correspond to a compensating value. Then, a compensating value may be input to a compensating circuit, which then may perform compensation.

Figure 5:
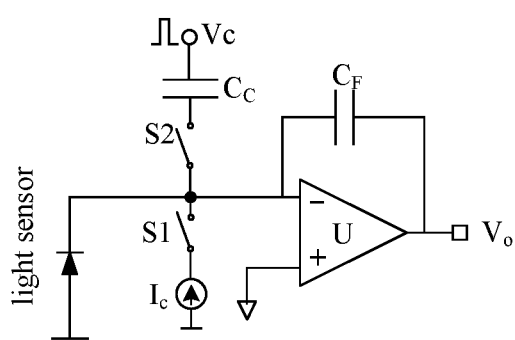
FIG. 5 is a diagram of a compensating circuit according to some embodiments of the present disclosure.

With embodiments herein, light sensor data may be compensated via hardware. To this end, the light sensor module may further include a compensating circuit provided at a front end of a ROIC. Referring to FIG. 5, the compensating circuit may be adapted to compensating the light sensor data collected by the light sensor module under the current incident light. According to some embodiments of the present disclosure, a compensating circuit may include an operational amplifier U, a feedback capacitor $C_F$, a compensating current source $I_C$, a first switch $S_1$, a compensating voltage source $V_C$, a second switch $S_2$, and a compensating capacitor $C_C$. An inverting input (denoted by "−") of the operational amplifier U may be connected to a photosensitive device inside the second detection region. A non-inverting input (denoted by "+") of the operational amplifier U may be grounded. The feedback capacitor $C_F$ may be connected in parallel between an output of the operational amplifier U and the inverting input of the operational amplifier U. The operational amplifier U, the feedback capacitor $C_F$, the compensating current source $I_C$, and the first switch $S_1$ may constitute a current compensating circuit. The operational amplifier U, the feedback capacitor $C_F$, the compensating voltage source $V_C$, the second switch $S_2$, and the compensating capacitor $C_C$ may constitute a voltage compensating circuit. A current compensating circuit and a voltage compensating circuit may be provided separately or simultaneously. When provided simultaneously, a current compensating circuit and a voltage compensating circuit may share the operational amplifier U and the feedback capacitor $C_F$. The current compensating circuit and the voltage compensating circuit may be provided separately or simultaneously according to a specific scene. A voltage compensating circuit may be selected if certain precision in detection is required. A current compensating circuit may be selected in a scene where large light sensor data are deducted and there is enough time or a large current.

The compensating circuit may work as follows.

In a first mode, the compensating circuit may perform compensation using a compensating current source.

Current of a light sensor may be pointed downward. That is, electric charge may move toward the feedback capacitor $C_F$ (electric charge may be drawn by the $C_F$). In this case, output voltage Vo may increase by $I_C*t/C_F$. The t may denote time during which electric charge continues moving toward the feedback capacitor $C_F$. Accordingly, in this case, the first switch $S_1$ may be switched on to connect the compensating current source. In this case, current of the compensating current source may be $-I_C*t/C_F$. That is, compensated voltage Vo'=Vo−Cc/$C_F$*Vc, thereby decreasing light sensor data.

In a second mode, the compensating circuit may perform compensation using the compensating voltage source $V_C$ and the compensating capacitor $C_C$.

When a base of a light sensor is overly large and compensation has to be performed, the second switch $S_2$ may be switched on. The feedback capacitor $C_F$ may be supplemented with electric charge in a reverse direction by adjusting compensating voltage Vc. In this case, the compensating voltage Vc may produce a change −Cc/$C_F$*Vc in the output of the operational amplifier. That is, compensated voltage Vo'=Vo−Cc/$C_F$*Vc, thereby decreasing light sensor data.

Note that with embodiments herein, it may be set beforehand whether calibration is performed using a voltage compensating circuit or a current compensating circuit. For example, only a voltage compensating circuit may be provided. That is, compensation may be performed only by voltage compensation. In some embodiments, only a current compensating circuit may be provided. That is, compensation may be performed only by current compensation. In some embodiments, a voltage compensating circuit and a current compensating circuit may be provided simultaneously. A trigger condition for triggering current compensation or voltage compensation may be provided beforehand, such as by providing a threshold. When a signal excess exceeds the threshold (i.e., large light sensor data may have to be deducted), the current compensating circuit may be triggered. That is, the current compensating circuit may be triggered by a trigger condition that the first light sensor data exceed the threshold, as a current compensating circuit may calibrate a wide range, i.e., a large signal interval. When a signal excess is no greater than the threshold, the voltage compensating circuit may be triggered, as voltage supplement is more precise when a signal excess is within a small interval.

So far, the specific structure of the light sensor module has been illustrated.

It may be seen that with embodiments herein, light sensor data under current incident light may be collected by at least one photosensitive device inside a first detection region on a substrate. Then, compensating data under the incident light inside a second detection region in a light sensor module may be determined using the light sensor data. Accordingly, light sensor data corresponding to the second detection region in the light sensor module may be compensated according to the compensating data. Compensated light sensor data may be set as final detected light sensor data. With embodiments herein, the amount of light sensor data acquired by a photosensitive device may be far less than the amount of light sensor data acquired by all photosensitive device on the substrate. Processing time may be reduced. Thus, light sensor data acquired subsequently may be compensated according to scenes of different incident light, thereby decreasing a signal base. Accordingly, a sum of a signal base and a signal per se may be made less than a dynamic range of a readout integrated circuit (ROIC), avoiding occurrence of an insufficient dynamic range of the ROIC.

Figure 6:
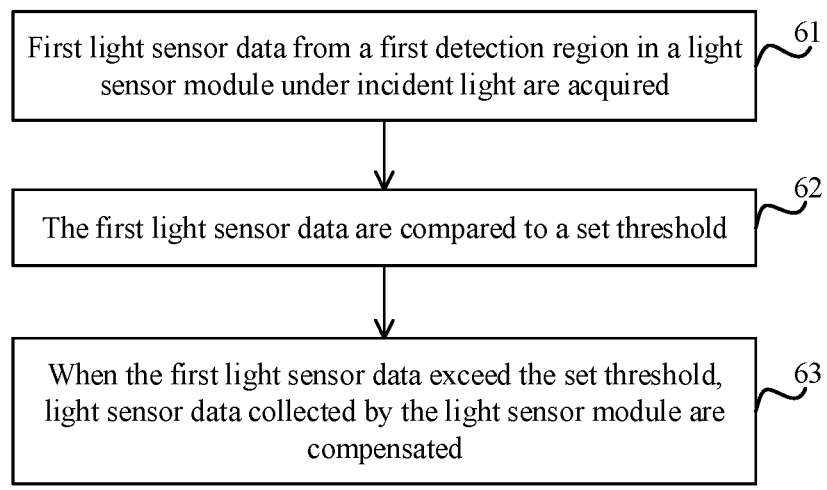
FIG. 6 is a flowchart of a method for acquiring light sensor data according to some embodiments of the present disclosure.

Based on the light sensor module, embodiments herein may further provide a method for acquiring light intensity. The method is applicable to electronic equipment provided with a light sensor module shown in FIG. 2. Referring to FIG. 6, the method may include block 61 through block 63.

In block 61, first light sensor data from a first detection region in a light sensor module under incident light are acquired.

In block 62, the first light sensor data are compared to a set threshold.

In block 63, when the first light sensor data exceed the set threshold, light sensor data collected by the light sensor module are compensated.

Figure 7:
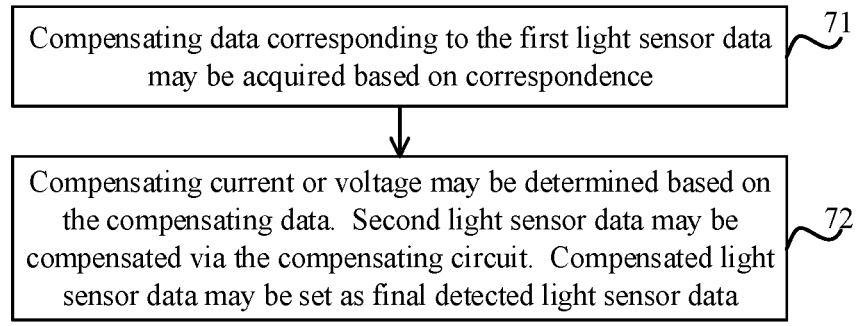
FIG. 7 is a flowchart of acquiring light sensor data according to some embodiments of the present disclosure.

According to some embodiments herein, referring to FIG. 7, the light sensor data collected by the light sensor module may be compensated as follows.

In block 71, compensating data corresponding to the first light sensor data may be acquired based on set-threshold-compensating-data correspondence.

In block 72, compensating current or compensating voltage of a compensating circuit in the light sensor module may be determined based on the compensating data. Second light sensor data collected by a photosensitive device inside a second detection region in the light sensor module may be compensated via the compensating circuit. Compensated light sensor data may be set as final detected light sensor data.

According to some embodiments herein, the method may further include a block as follows.

When the first light sensor data are no greater than the set threshold, second light sensor data collected by a photosensitive device inside a second detection region in the light sensor module may be set as final detected light sensor data.

According to some embodiments herein, the light sensor data collected by the light sensor module may be compensated as follows.

It may be triggered that the light sensor data collected by the light sensor module are compensated by a current compensating circuit.

According to some embodiments herein, the light sensor data collected by the light sensor module may be compensated as follows.

It may be triggered that the light sensor data collected by the light sensor module are compensated by a voltage compensating circuit.

According to some embodiments herein, the first detection region may include multiple sub detection regions. Then, the first light sensor data from the first detection region in the light sensor module under the incident light may be acquired as follows.

Light sensor data collected by pixels inside the multiple sub detection regions may be read simultaneously.

Maximal light sensor data may be determined as the first light sensor data.

According to some embodiments herein, the first detection region may include multiple sub detection regions. Then, the first light sensor data from the first detection region in the light sensor module under the incident light may be acquired as follows.

Light sensor data collected by pixels inside each of the multiple sub detection regions may be read sub region by sub region or row by row.

Maximal light sensor data may be determined as the first light sensor data.

Understandably, the method according to some embodiments herein may correspond to a work process of the light sensor module. Refer to content of some embodiments relating to the light sensor module for specific content of the method, which is not repeated herein.

So far, with embodiments herein, the amount of light sensor data acquired by a photosensitive device may be far less than the amount of light sensor data acquired by all photosensitive device on the substrate. Processing time may be reduced. Thus, light sensor data acquired subsequently may be compensated according to scenes of different incident light, thereby decreasing a signal base. Accordingly, a sum of a signal base and a signal per se may be made less than a dynamic range of a readout integrated circuit (ROIC), avoiding occurrence of an insufficient dynamic range of the ROIC.

Figure 8:
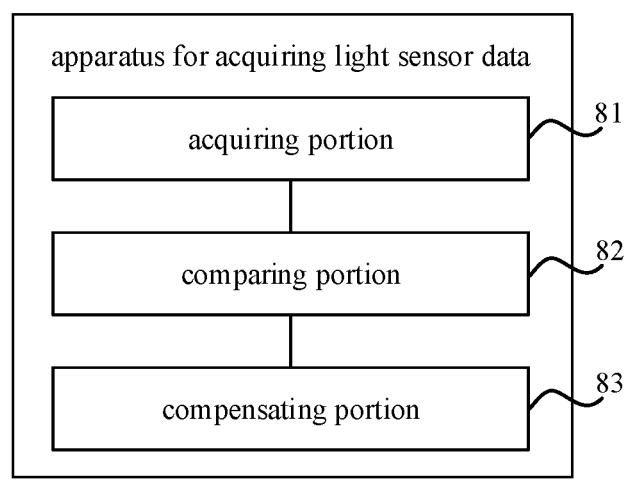
FIG. 8 is a first block diagram of an apparatus for acquiring light intensity according to some embodiments of the present disclosure.

FIG. 8 is a block diagram of an apparatus for acquiring light sensor data according to some embodiments of the present disclosure. Referring to FIG. 8, the apparatus may include an acquiring portion, a comparing portion, and a compensating portion.

The acquiring portion 81 may be adapted to acquiring first light sensor data from a first detection region in a light sensor module under incident light.

The comparing portion 82 may be adapted to comparing the first light sensor data to a set threshold.

The compensating portion 83 may be adapted to, in response to determining that the first light sensor data exceed the set threshold, compensating light sensor data collected by the light sensor module.

Figure 9:
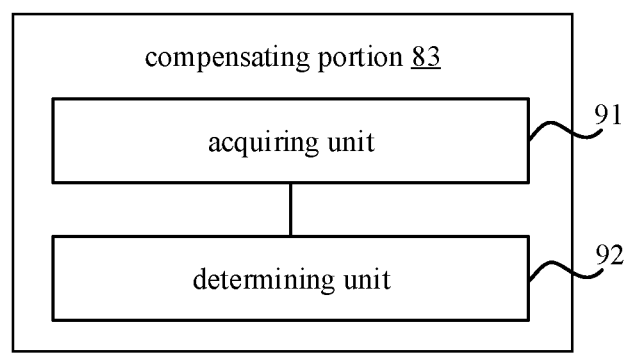
FIG. 9 is a second block diagram of an apparatus for acquiring light intensity according to some embodiments of the present disclosure.

According to some embodiments herein, referring to FIG. 9, the compensating portion 83 may include an acquiring component and a determining component.

The acquiring component 91 may be adapted to acquiring compensating data corresponding to the first light sensor data based on set-threshold-compensating-data correspondence.

The determining component 92 may be adapted to: determining, based on the compensating data, compensating current or compensating voltage of a compensating circuit in the light sensor module; compensating, via the compensating circuit, second light sensor data collected by a photosensitive device inside a second detection region in the light sensor module; and setting compensated light sensor data as final detected light sensor data.

According to some embodiments herein, the compensating portion may further be adapted to, in response to determining that the first light sensor data are no greater than the set threshold, setting second light sensor data collected by a photosensitive device inside a second detection region in the light sensor module as final detected light sensor data.

According to some embodiments herein, the compensating portion may include a determining component and a triggering component.

The determining component may be adapted to determining whether the first light sensor data meet a trigger condition.

The triggering component may be adapted to, in response to determining that the trigger condition is met, triggering compensating, by a current compensating circuit, the light sensor data collected by the light sensor module; in response to determining that the trigger condition is not met, triggering compensating, by a voltage compensating circuit, the light sensor data collected by the light sensor module.

According to some embodiments herein, the compensating portion may include a triggering component.

The triggering component may be adapted to triggering compensating, by a current compensating circuit, the light sensor data collected by the light sensor module.

According to some embodiments herein, the compensating portion may include a triggering component.

The triggering component may be adapted to triggering compensating, by a voltage compensating circuit, the light sensor data collected by the light sensor module.

According to some embodiments herein, the first detection region may include multiple sub detection regions. Then, the acquiring portion may include a simultaneous data acquiring component and a first data determining component.

The simultaneous data acquiring component may be adapted to simultaneously reading light sensor data collected by pixels inside the multiple sub detection regions.

The first data determining component may be adapted to determining maximal light sensor data as the first light sensor data.

According to some embodiments herein, the first detection region may include multiple sub detection regions. Then, the acquiring portion may include a row by row data acquiring component and a second data determining component.

The row by row data acquiring component may be adapted to reading light sensor data collected by pixels inside each of the multiple sub detection regions sub region by sub region or row by row.

The second data determining component may be adapted to determining maximal light sensor data as the first light sensor data.

Understandably, the apparatus according to some embodiments herein may correspond to the method. Refer to content of these embodiments relating to the method for specific content of the apparatus, which is not repeated herein.

Electronic equipment includes a display, a light sensor module, a processor, and memory.

The light sensor module is provided under the display.

The memory is adapted to storing a computer program executable by the processor.

The processor is adapted to implement the method herein.

Figure 10:
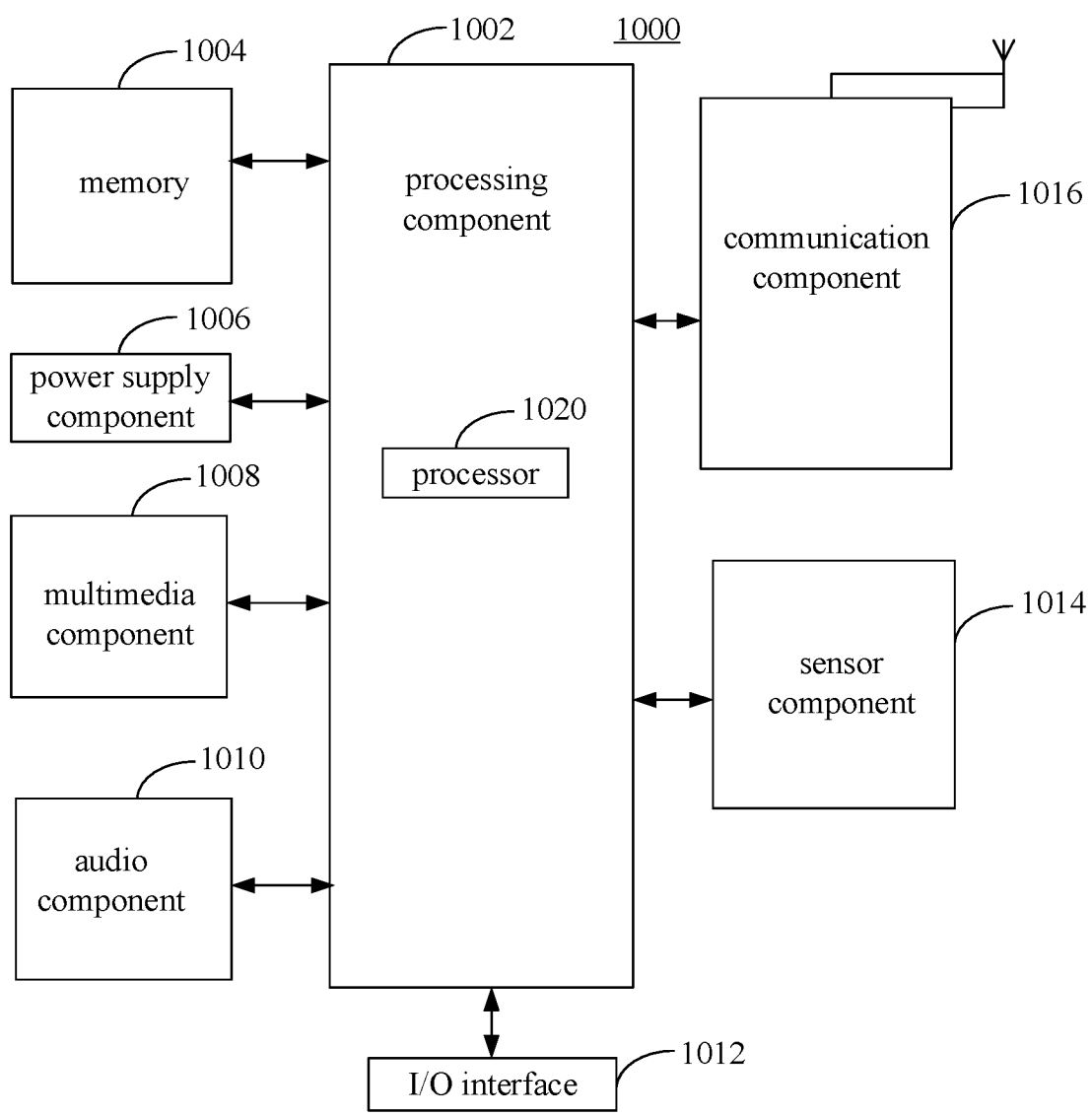
FIG. 10 is a block diagram of electronic equipment according to some embodiments of the present disclosure.

FIG. 10 is a block diagram of electronic equipment according to some embodiments of the present disclosure. For example, the electronic equipment 1000 may be User Equipment (UE) such as a smart phone, a computer, digital broadcast UE, tablet equipment, medical equipment, fitness equipment, a personal digital assistant, etc.

Referring to FIG. 10, the electronic equipment 1000 may include at least one of a processing component 1002, memory 1004, a power supply component 1006, a multimedia component 1008, an audio component 1010, an Input/Output (I/O) interface 1012, a sensor component 1014, a communication component 1016, an image capturing component 1018, etc.

The processing component 1002 may generally control an overall operation of the electronic equipment 1000, such as operations associated with display, a telephone call, data communication, a camera operation, a recording operation, etc. The processing component 1002 may include one or more processors 1020 to execute a computer program, so as to complete all or a part of an aforementioned method. In addition, the processing component 1002 may include one or more modules to facilitate interaction between the processing component 1002 and other components. For example, the processing component 1002 may include a multimedia portion to facilitate interaction between the multimedia component 1008 and the processing component 1002.

The memory 1004 may be adapted to storing various types of data to support the operation at the electronic equipment 1000. Examples of such data may include a computer program of any method or any application adapted to operating on the electronic equipment 1000, contact data, phonebook data, messages, pictures, videos, etc. The memory 1004 may be realized by any type of transitory or non-transitory storage equipment or a combination thereof, such as Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, a magnetic disk, a compact disk, etc.

The power supply component 1006 may supply electric power to various components of the electronic equipment 1000. The power supply component 1006 may include a power management system, one or more power sources, and other components related to generating, managing, and distributing electricity for the electronic equipment 1000.

The multimedia component 1008 may include a screen that provides an output interface between the electronic equipment 1000 and a target object. The screen may include a Liquid Crystal Display (LCD), a Touch Panel (TP), etc. In some embodiments, organic light-emitting diode (OLED) or other types of displays can be employed. If the screen includes a TP, the screen may be realized as a touch screen to receive a signal input by a target object. The TP may include one or more touch sensors for sensing touch, slide, and gestures on the TP. The one or more touch sensors not only may sense the boundary of a touch or slide move, but also detect the duration and pressure related to the touch or slide move. The multimedia component 1008 may include at least one of a front camera or a rear camera. When the electronic equipment 1000 is in an operation mode such as a photographing mode or a video mode, at least one of the front camera or the rear camera may receive external multimedia data. Each of the front camera or the rear camera may be a fixed optical lens system or may have a focal length and be capable of optical zooming.

The audio component 1010 may be adapted to outputting and/or inputting an audio signal. For example, the audio component 1010 may include a microphone (MIC). When the electronic equipment 1000 is in an operation mode such as a call mode, a recording mode, a voice recognition mode, etc., the MIC may be adapted to receiving an external audio signal. The received audio signal may be further stored in the memory 1004 or may be sent via the communication component 1016. The audio component 1010 may further include a loudspeaker adapted to outputting the audio signal.

The I/O interface 1012 may provide an interface between the processing component 1002 and a peripheral interface portion. Such a peripheral interface portion may be a keypad, a click wheel, a button, etc. Such a button may include but is not limited to at least one of a homepage button, a volume button, a start button, or a lock button.

The sensor component 1014 may include one or more sensors for assessing various states of the electronic equipment 1000. For example, the sensor component 1014 may detect an on/off state of the electronic equipment 1000 and relative positioning of components such as the display and the keypad of the electronic equipment 1000. The sensor component 1014 may further detect a change in the position of the electronic equipment 1000 or of a component of the electronic equipment 1000, whether there is contact between the electronic equipment 1000 and a target object, the orientation or acceleration/deceleration of the electronic equipment 1000, a change in the temperature of the electronic equipment 1000, etc. The sensor component 1014 may include a proximity sensor adapted to detecting existence of a nearby object without physical contact. The sensor component 1014 may further include an optical sensor such as a Complementary Metal-Oxide-Semiconductor (CMOS) or a Charge-Coupled-Device (CCD) image sensor used in an imaging application. The sensor component 1014 may further include an acceleration sensor, a gyroscope sensor, a magnetic sensor, a pressure sensor, a temperature sensor, etc.

The communication component 1016 may be adapted to facilitating wired or wireless communication between the electronic equipment 1000 and other equipment. The electronic equipment 1000 may access a wireless network based on a communication standard such as Wi-Fi, 2G, 3G, 4G, 5G or a combination thereof. The communication component 1016 may broadcast related information or receive a broadcast signal from an external broadcast management system via a broadcast channel. The communication component 1016 may include a Near Field Communication (NFC) module for short-range communication. For example, the NFC module may be based on technology such as Radio Frequency Identification (RFID), Infrared Data Association (IrDA), Ultra-Wideband (UWB) technology, Bluetooth (BT), etc.

The electronic equipment 1000 may be realized by one or more electronic components such as an Application Specific Integrated Circuit (ASIC), a Digital Signal Processor (DSP), a Digital Signal Processing Device (DSPD), a Programmable Logic Device (PLD), a Field Programmable Gate Array (FPGA), a controller, a microcontroller, a microprocessor, etc., to implement the method.

A non-transitory computer-readable storage medium including an executable computer program, such as memory 1004 including instructions, may be provided. The executable computer program may be executed by a processor to implement an aforementioned method. The computer-readable storage medium may be Read-Only Memory (ROM), Compact Disc Read-Only Memory (CD-ROM), a magnetic tape, a floppy disk, optical data storage equipment, etc.

A non-transitory computer-readable storage medium has stored thereon an executable computer program which, when executed, implements the method herein.

The various device components, modules, components, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A light sensor module, comprising a substrate, a readout integrated circuit (ROIC), and a compensating circuit provided at a front end of the ROIC wherein:
the substrate comprises a first detection region and a second detection region, wherein the first detection region is provided outside the second detection region, and an area of the first detection region is less than an area of the second detection region;
a number of photosensitive devices are provided inside the second detection region, wherein the photosensitive devices provided inside the second detection region are configured to collect second light sensor data under incident light, wherein the second light sensor data are light sensor data collected by the light sensor module under the incident light;
at least one photosensitive device is provided in the first detection region; the at least one photosensitive device provided in the first detection region is configured to collect first light sensor data from the first detection region under the incident light, wherein the first light sensor data are used to assist in determining whether the second light sensor data are to be compensated; and
the compensating circuit is configured to compensate the second light sensor data.

2. The light sensor module of claim 1, wherein:
the first detection region comprises at least one sub detection region; and
the at least one sub detection region is provided respectively at a vertex of the second detection region.

3. The light sensor module of claim 1, wherein an area of a photosensitive device inside the first detection region is greater than an area of a photosensitive device inside the second detection region.

4. The light sensor module of claim 3, wherein:
the at least one photosensitive device comprises multiple photosensitive devices;
gate lines of the multiple photosensitive devices are connected to each other; and
data lines of the multiple photosensitive devices are connected to each other.

5. The light sensor module of claim 1, wherein:
the compensating circuit comprises a current compensating circuit;
the current compensating circuit comprises an operational amplifier, a feedback capacitor, a compensating current source, and a first switch,
an inverting input of the operational amplifier is connected to a photosensitive device inside the second detection region, wherein a non-inverting input of the operational amplifier is grounded, wherein the feedback capacitor is connected in parallel between an output of the operational amplifier and the inverting input of the operational amplifier; and
wherein the compensating current source is connected to the inverting input of the operational amplifier via the first switch.

6. The light sensor module of claim 1, wherein:
the compensating circuit comprises a voltage compensating circuit;
the voltage compensating circuit comprises an operational amplifier, a feedback capacitor, a compensating voltage source, a second switch, and a compensating capacitor;
an inverting input of the operational amplifier is connected to a photosensitive device inside the second detection region, wherein a non-inverting input of the operational amplifier is grounded, wherein the feedback capacitor is connected in parallel between an output of the operational amplifier and the inverting input of the operational amplifier; and
a first end of the compensating capacitor is connected to the compensating voltage source, wherein a second end of the compensating capacitor is connected to the inverting input of the operational amplifier via the second switch.

7. The light sensor module of claim 1, wherein:
the compensating circuit comprises a voltage compensating circuit and a current compensating circuit;
the voltage compensating circuit and the current compensating circuit share an operational amplifier and a feedback capacitor;
the current compensating circuit further comprises a compensating current source and a first switch;
the voltage compensating circuit further comprises a compensating voltage source, a compensating capacitor, and a second switch;
an inverting input of the operational amplifier is connected to a photosensitive device inside the second detection region;
a non-inverting input of the operational amplifier is grounded;
the feedback capacitor is connected in parallel between an output of the operational amplifier and the inverting input of the operational amplifier;
the compensating current source is connected to the inverting input of the operational amplifier via the first switch;

a first end of the compensating capacitor is connected to the compensating voltage source; and a second end of the compensating capacitor is connected to the inverting input of the operational amplifier via the second switch.

8. A method for acquiring light sensor data, applied to electronic equipment provided with a light sensor module, the light sensor module comprising a substrate, a readout integrated circuit (ROIC), and a compensating circuit provided at a front end of the ROIC, the substrate comprising a first detection region and a second detection region, the first detection region being provided outside the second detection region, an area of the first detection region being less than an area of the second detection region; a number of photosensitive devices being provided inside the second detection region, the photosensitive devices provided inside the second detection region being configured to collect second light sensor data under incident light, the second light sensor data being light sensor data collected by the light sensor module under the incident light; at least one photosensitive device being provided in the first detection region; the at least one photosensitive device provided in the first detection region being configured to collect first light sensor data from the first detection region under the incident light, the first light sensor data being used to assist in determining whether the second light sensor data are to be compensated; the compensating circuit being configured to compensate the second light sensor data; the method comprising:

acquiring the first light sensor data from the first detection region in the light sensor module under the incident light;

comparing the first light sensor data to a set threshold; and in response to determining that the first light sensor data exceed the set threshold, compensating the second light sensor data collected by the light sensor module using the compensating circuit.

9. The method of claim 8, wherein compensating the second light sensor data collected by the light sensor module comprises:

acquiring compensating data corresponding to the first light sensor data based on set-threshold-compensating-data correspondence, by setting light sensor data within a distinct interval to correspond to a compensating value;

determining, based on the compensating data, compensating current or compensating voltage of the compensating circuit in the light sensor module;

compensating, via the compensating circuit, the second light sensor data; and setting compensated second light sensor data as final detected light sensor data.

10. The method of claim 8, further comprising:

in response to determining that the first light sensor data are no greater than the set threshold, setting the second light sensor data as final detected light sensor data.

11. The method of claim 8, wherein compensating the second light sensor data collected by the light sensor module comprises:

determining whether the first light sensor data meet a trigger condition;

in response to determining that the trigger condition is met, triggering compensating, by a current compensating circuit, the second light sensor data collected by the light sensor module;

in response to determining that the trigger condition is not met, triggering compensating, by a voltage compensating circuit, the second light sensor data collected by the light sensor module.

12. The method of claim 8, wherein compensating the second light sensor data collected by the light sensor module comprises:

triggering compensating, by a current compensating circuit, the second light sensor data collected by the light sensor module.

13. The method of claim 8, wherein compensating the second light sensor data collected by the light sensor module comprises:

triggering compensating, by a voltage compensating circuit, the second light sensor data collected by the light sensor module.

14. The method of claim 8, wherein the first detection region comprises multiple sub detection regions, wherein acquiring the first light sensor data from the first detection region in the light sensor module under the incident light comprises:

simultaneously reading light sensor data collected by pixels inside the multiple sub detection regions; and determining maximal light sensor data as the first light sensor data.

15. The method of claim 8, wherein the first detection region comprises multiple sub detection regions, wherein acquiring the first light sensor data from the first detection region in the light sensor module under the incident light comprises:

reading light sensor data collected by pixels inside each of the multiple sub detection regions sub region by sub region or row by row; and determining maximal light sensor data as the first light sensor data.

16. Electronic equipment, comprising a display, the light sensor module of claim 1, a processor, and memory, wherein the light sensor module is provided under the display, wherein the memory is adapted to store a computer program executable by the processor, wherein the processor is adapted to perform:

acquiring the first light sensor data from the first detection region in the light sensor module under the incident light;

comparing the first light sensor data to a set threshold; and in response to determining that the first light sensor data exceed the set threshold, compensating the second light sensor data collected by the light sensor module using the compensating circuit.

17. The electronic equipment of claim 16, wherein compensating the second light sensor data collected by the light sensor module comprises:

acquiring compensating data corresponding to the first light sensor data based on set-threshold-compensating-data correspondence, by setting light sensor data within a distinct interval to correspond to a compensating value;

determining, based on the compensating data, compensating current or compensating voltage of the compensating circuit in the light sensor module;

compensating, via the compensating circuit, the second light sensor data; and setting compensated second light sensor data as final detected light sensor data.

18. A mobile terminal comprising the photosensitive module of claim 1, further comprising a display screen; wherein:
- the second light sensor data collected by the light sensor module corresponding to the second detection region in the light sensor module are compensated based on the first light sensor data; in response to determining that the first light sensor data are no greater than a set threshold, the mobile terminal is configured to set the second light sensor data after compensation as final detected light sensor data;
- the first light sensor data are substantially less than light sensor data acquired by all photosensitive devices on the substrate, thereby reducing processing time while compensating the second light sensor data according to different incident light levels, decreasing a signal base, and a sum of the signal base and a signal are substantially smaller than a dynamic range of the ROIC;
- the first detection region comprises a bar-shaped sub region having a length greater than a typical width of a finger, to ensure that a photosensitive device inside the first detection region detects the incident light.

\* \* \* \* \*